(12) United States Patent
Uejima

(10) Patent No.: US 8,235,496 B2
(45) Date of Patent: Aug. 7, 2012

(54) PRINTING APPARATUS

(75) Inventor: Atsushi Uejima, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 1399 days.

(21) Appl. No.: 11/882,998

(22) Filed: Aug. 8, 2007

(65) Prior Publication Data

US 2008/0036798 A1 Feb. 14, 2008

(30) Foreign Application Priority Data

Aug. 9, 2006 (JP) ................................. 2006-216488

(51) Int. Cl.
*B41J 29/393* (2006.01)

(52) U.S. Cl. ......................................................... 347/19
(58) Field of Classification Search .................... 347/15, 347/16, 19; 358/1.2, 1.9
See application file for complete search history.

(56) References Cited

U.S. PATENT DOCUMENTS

| 6,039,426 A * | 3/2000 | Dobbs ............................. 347/19 |
| 7,055,929 B2 * | 6/2006 | Yabuta ............................ 347/19 |
| 7,533,954 B2 * | 5/2009 | Nakazawa et al. .............. 347/16 |

FOREIGN PATENT DOCUMENTS

JP          2004-74666 A       3/2004

* cited by examiner

*Primary Examiner* — Lamson Nguyen
(74) *Attorney, Agent, or Firm* — Birch, Stewart, Kolasch & Birch, LLP

(57) ABSTRACT

The printing apparatus has: a recording medium holding device which holds a recording medium; a recording information acquisition device which acquires data relating to recording information recorded on the recording medium; a storage device which stores data relating to character images; an automatic determination device which automatically selects the character image corresponding to the data relating to the recording information recorded on the recording medium, from the character images stored in the storage device; and a printing device which prints the character image selected by the automatic determination device, onto a surface of the recording medium.

4 Claims, 8 Drawing Sheets

|  |  | RECORDING MEDIUM | |
|---|---|---|---|
|  |  | PICTURE CARD | DISK MEDIUM |
| FILE ATTRIBUTE | MUSIC | ♪ | ♪ MUSIC |
|  | WRITTEN DOCUMENT | 文 | 文 WRITING |
|  | CAMERA IMAGE | 📷 | 📷 CAMERA |

FIG.4

| FILE ATTRIBUTE | RECORDING MEDIUM | |
|---|---|---|
| | PICTURE CARD | DISK MEDIUM |
| MUSIC | ♪ | ♪ MUSIC |
| WRITTEN DOCUMENT | 文 | 文 WRITING |
| CAMERA IMAGE | 📷 | 📷 CAMERA |

PRINTING APPARATUS

BACKGROUND OF THE INVENTION

1. Field of the Invention

The present invention relates to a printing apparatus, and more particularly to a printing apparatus which is suitable for printing, onto the surface of a recording medium, the contents of recording information on the recording medium.

2. Description of the Related Art

In order that a user of a recording medium, such as a picture card or another memory card, or a compact disk or other disk medium, can distinguish the contents of the recording information of the recording medium, from the exterior of the recording medium, the user himself or herself has manually written text, a symbol, a drawing, or the like, into an entry space provided on the surface of the recording medium, or has attached a sticker-type index label edited on a personal computer and printed by a printer.

Furthermore, Japanese Patent Application Publication No. 2004-74666 discloses technology in which a video and audio data stream recorded on a disk is reproduced, the image information of one portion of the video information is stored internally, a device for inputting text information is also provided, and the internally stored video image and input text information are printed.

However, in recent years, recording media have progressively become more compact in size and the entry space provided on the surface thereof has become smaller and smaller. Therefore, it is extremely bothersome for a user manually to enter text, a symbol, a drawing, or the like, in an entry space of this kind, or to attach a sticker-type index label. Furthermore, it is difficult to distinguish the recording information on the recording medium from external, and a user must read out the recording information by means of a reading apparatus in order to confirm the contents of the information, and then enter text, a symbol, a picture, or the like, from which the contents can be identified, in the entry space on the recording medium. This process involves a great deal of trouble and effort.

Furthermore, in Japanese Patent Application Publication No. 2004-74666, actual image information which is a portion of the video information recorded on the disk, is simply printed onto the print surface of a disk. Therefore, it is difficult to distinguish the contents of the recording information. Moreover, in recent years, the recording capacity of recording media has increased dramatically, and recording media have come to hold an extremely large amount of recording information. Therefore, it is difficult for a user to distinguish all of the contents of the recording information in a recording medium, and it is difficult to judge what information should be entered as identifiable information on the surface of the recording medium.

SUMMARY OF THE INVENTION

The present invention has been contrived in view of these circumstances, an object thereof being to provide a printing apparatus which is capable of recording information rapidly and simply onto the surface of a recording medium, whereby the contents of any recording information can be identified.

In order to attain the aforementioned object, the present invention is directed a printing apparatus comprising: a recording medium holding device which holds a recording medium; a recording information acquisition device which acquires data relating to recording information recorded on the recording medium; a storage device which stores data relating to character images; an automatic determination device which automatically selects the character image corresponding to the data relating to the recording information recorded on the recording medium, from the character images stored in the storage device; and a printing device which prints the character image selected by the automatic determination device, onto a surface of the recording medium.

In this aspect of the present invention, a character image corresponding to the data relating to recording information acquired by the recording information acquisition device is automatically determined from the storage device and is printed on the surface of the recording medium; therefore, the user is able to print a character image corresponding to the data relating to the recording information, on the surface of the recording medium, simply by holding the recording medium in the recording medium holding device to acquire the data of the recording information on the recording medium. Hence, the trouble and effort required by the user is reduced dramatically. Therefore, it is possible readily to identify the contents of the recording information recorded on the recording medium, on the basis of the character image recorded on the surface of the recording medium.

Preferably, the printing apparatus further comprises: a display device which displays the recording information and the character images; a manual determination device via which the character image corresponding to the data relating to the recording information recorded on the recording medium is selected manually; and a determination method selection device which enables choice of whether to select the character image by means of the automatic determination device or whether to select the character image by means of the manual determination device.

In this aspect of the present invention, the recording information and character images are displayed on the display device; therefore, a user is able, him or herself, to determine manually a desired character corresponding to data relating to recording information, and to print it readily onto the surface of the recording medium. Moreover, the user is able to choose whether the character image is to be determined by the automatic determination device, as he or she desires; therefore, in cases where it is difficult for the user to determine the character image him or herself, due to the circumstances of the recording on the recording medium, the user can cause the character image to be determined by the automatic determination device and can cause a suitable identifiable character image to be printed onto the surface of the recording medium.

The determination method selection device may be included in the display device, as a device which allows the selection by means of the display on the display device.

Preferably, when a plurality of data relating to the recording information are recorded on the recording medium, the automatic determination device counts number of files recorded on the recording medium for each of the plurality of data relating to recording information, and selects the character image for the data relating to the recording information having the greatest number of files recorded on the recording medium as the character image corresponding to the data relating to the recording information recorded on the recording medium.

In this aspect of the present invention, a character image corresponding to data relating to recording information which has been recorded the greatest number of times is determined and printed on the surface of the recording medium; therefore, even if there is a very large number of data relating to recording information on the recording medium, the user is still able readily to identify the data relating to the recording information which has been recorded the greatest number of times onto the recording medium. Therefore, it is possible readily to use the data relating to the recording information which has been recorded the greatest number of times onto the recording medium and which is considered to have the relatively high frequency of use.

Preferably, when a plurality of data relating to the recording information are recorded on the recording medium, the automatic determination device measures size of a data volume of each of the plurality of data relating to recording information, and selects the character image for the data relating to the recording information having the greatest size of the data volume as the character image corresponding to the data relating to the recording information recorded on the recording medium.

In this aspect of the present invention, a character image corresponding to data relating to recording information which has the greatest data volume is determined and printed on the surface of the recording medium; therefore, even if there is a very large number of data relating to recording information on the recording medium, the user is still able readily to identify the data relating to the recording information having the greatest data volume, of the recording information recorded on the recording medium. Therefore, it is possible readily to use the data relating to the recording information which has the greatest recording size on the recording medium and which is considered to have the relatively high frequency of use.

According to the present invention, it is possible to provide a printing apparatus whereby information which allows the contents of recording information to be identified can be printed, rapidly and simply, onto the surface of a recording medium.

BRIEF DESCRIPTION OF THE DRAWINGS

The nature of this invention, as well as other objects and benefits thereof, will be explained in the following with reference to the accompanying drawings, in which like reference characters designate the same or similar parts throughout the figures and wherein:

FIG. 4 is a table showing examples of correspondences between file attributes, character images and recording media;

DETAILED DESCRIPTION OF THE PREFERRED EMBODIMENTS

Composition and Action of Printing Apparatus

Firstly, a first embodiment of the present invention is described below.

Figure 1:
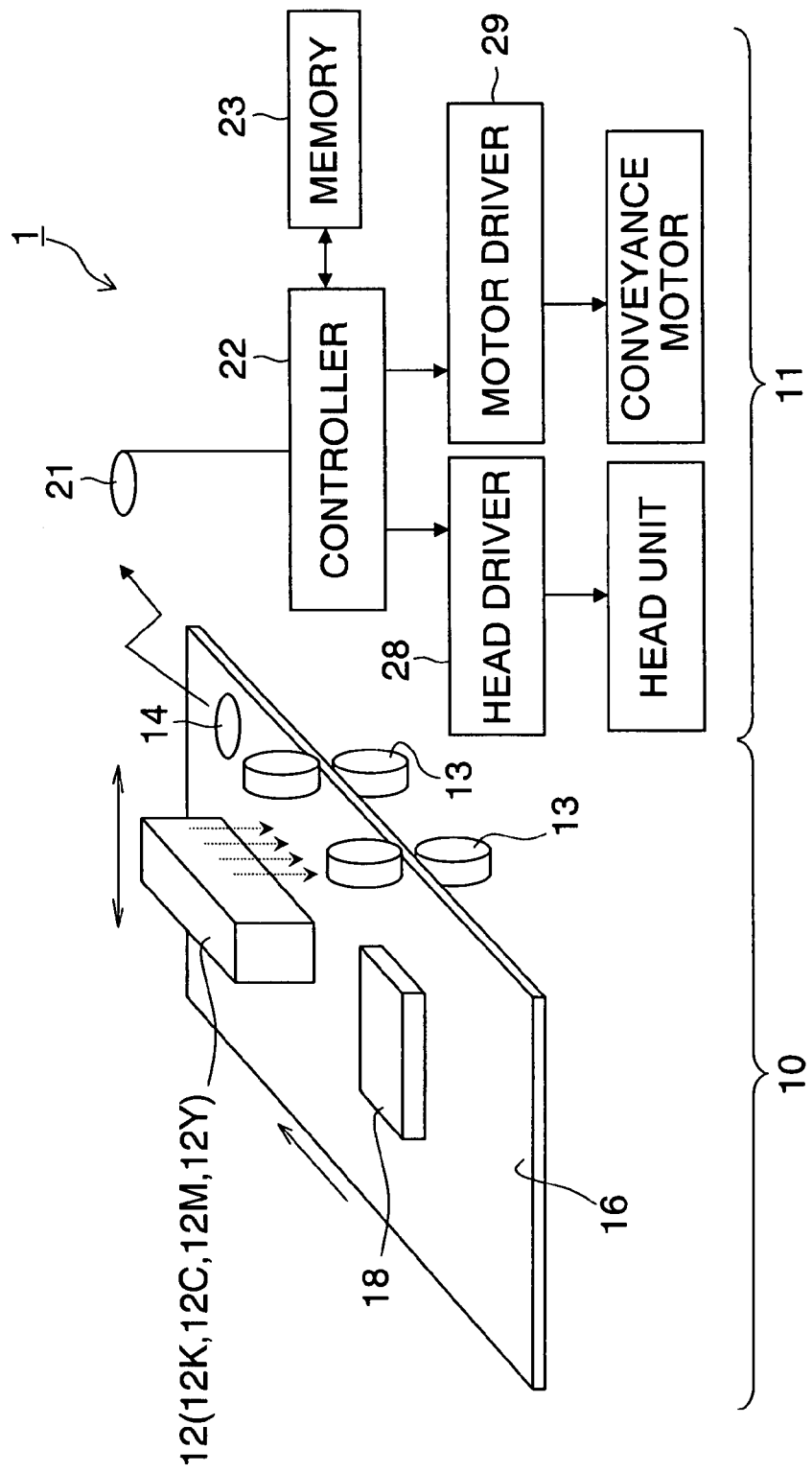
FIG. 1 is a general schematic drawing of a printing apparatus according to a first embodiment of the invention.
Figure 2:
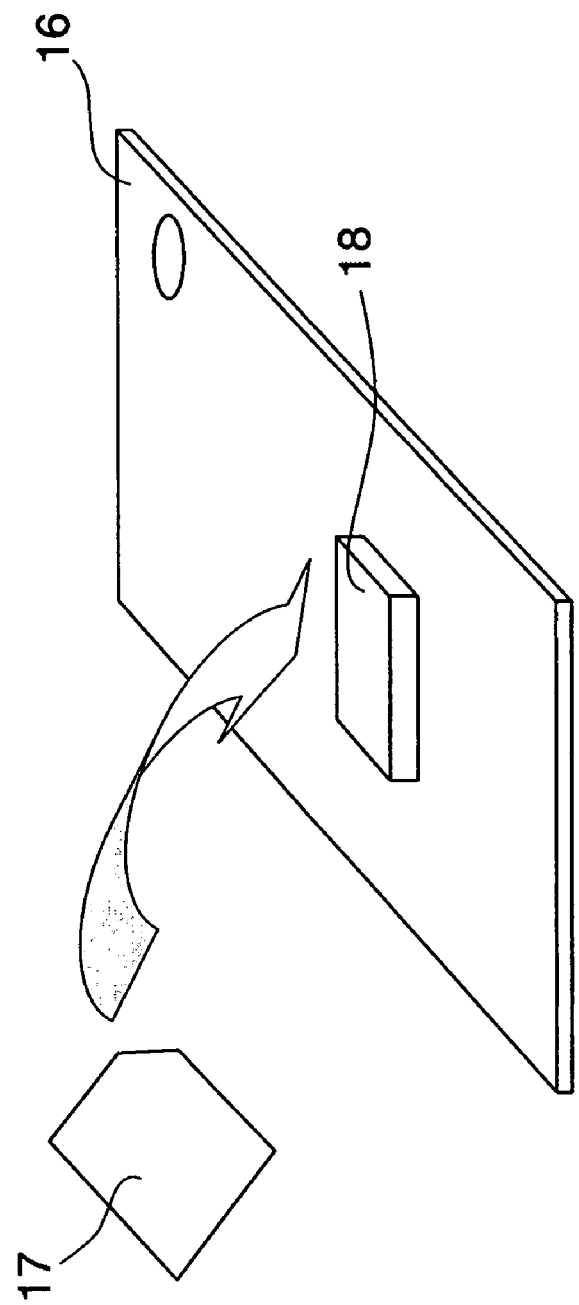
FIG. 2 is an oblique external view of a holding member for a memory card.

FIG. 1 is a general schematic drawing of a printing apparatus 1 according to the first embodiment; and FIG. 2 is an external oblique diagram of a holding member with a card connector that holds a memory card, which is the recording medium to be printed. As shown in FIG. 1, the printing apparatus 1 according to the present embodiment comprises a print mechanism 10 and a control mechanism 11.

The print mechanism 10 comprises: a head unit 12 having a plurality of inkjet recording heads (hereinafter, called "heads") 12K, 12C, 12M and 12Y provided respectively for inks of the colors, black (K), cyan (C), magenta (M) and yellow (Y); rollers 13 for conveying a plate-shaped member 16; a transmission unit 14 which transmits data relating to the recording information recorded in the memory card, to the control mechanism 11; and the like. Furthermore, as shown in FIG. 2, a card connector 18 which holds the memory card 17 is provided with the plate-shaped holding member 16.

In the present example, although a configuration with the four standard colors of K, M, C and Y is described as the head unit 12 in the present embodiment, the combinations of the ink colors and the number of colors are not limited to these. Light and/or dark inks, and special color inks can be added as required. For example, a configuration is possible in which inkjet heads for ejecting light-colored inks, such as light cyan and light magenta, are added. Furthermore, there are no particular restrictions on the sequence in which the heads of respective colors are arranged.

The transmission unit 14 transmits data relating to the recording information of the memory card 17, to the reception unit 21 provided in the control mechanism 11.

Furthermore, the control mechanism 11 comprises the reception unit 21, a control unit 22, a memory 23, a head driver 28, a motor driver 29, and the like. The reception unit 21 is an interface unit which receives data relating to the recording information on the memory card 17 transmitted from the transmission unit 14 provided in the print mechanism 10, via a wireless network.

The control unit 22 controls the respective units, namely, the reception unit 21, the memory 23, the head driver 28, the motor driver 29, and the like. The memory 23 stores data relating to character images which correspond to the data relating to the recording information recorded on the memory card 17. The head driver 28 is a driver (drive circuit) which drives the piezoelectric elements of the heads 12K, 12C, 12M and 12Y of the respective colors, on the basis of a character image identified according to the data stored in the memory 23. A feedback control system for maintaining constant drive conditions for the heads may be included in the head driver 28. The motor driver 29 is a driver which drives a conveyance motor for conveying the holding member 16.

The control unit 22 acquires a character image corresponding to the data relating to the recording information recorded in the memory card 17, from the character images stored in the memory 23, and issues an instruction for an operation of printing that character image, to the print mechanism 10, while controlling the head driver 28 and the motor driver 29.

Figure 3:
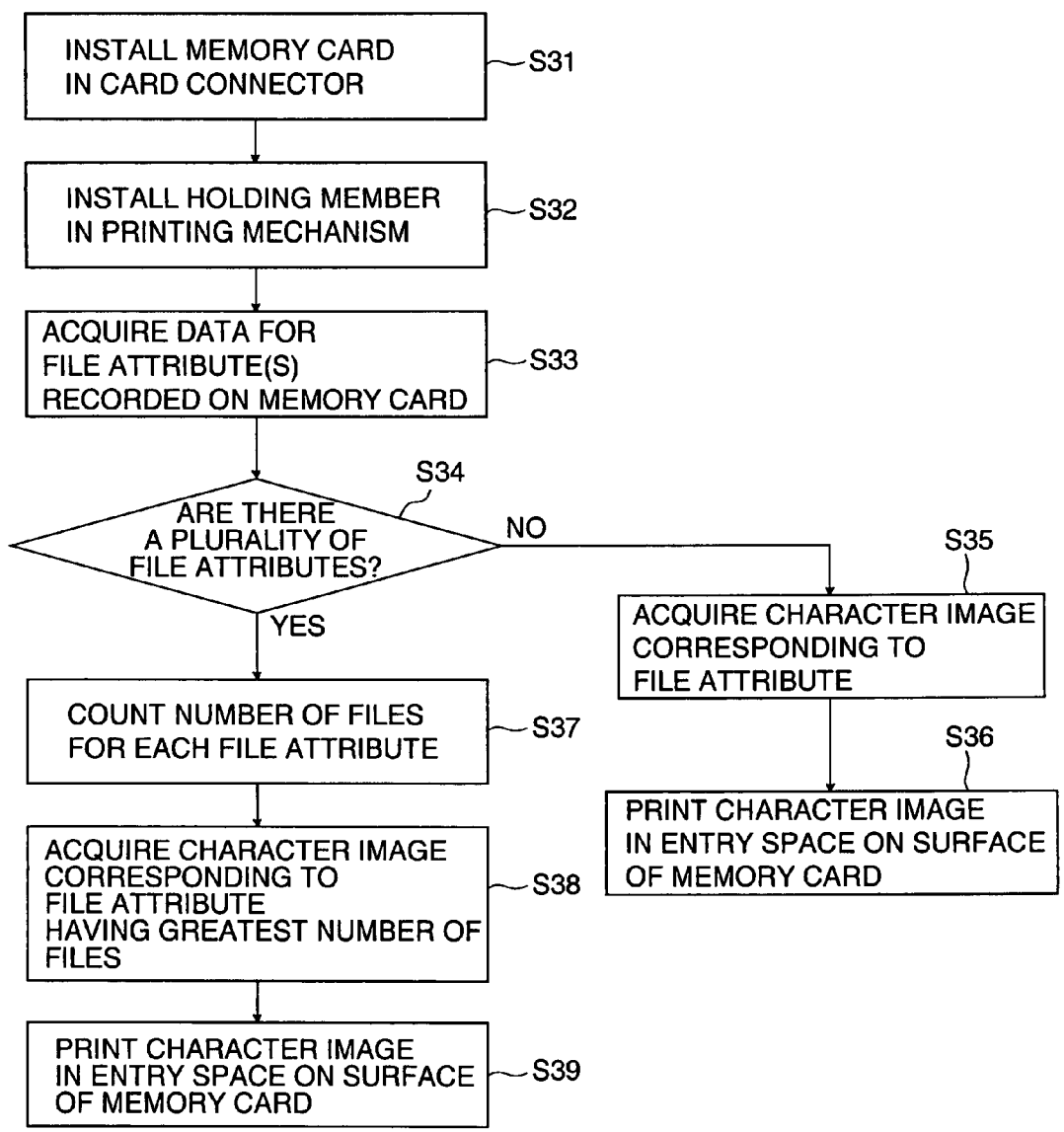
FIG. 3 is a flowchart showing the action of the printing apparatus according to the first embodiment of the invention.

The action of printing apparatus according to the first embodiment having a composition of this kind is described below. FIG. 3 is a flowchart showing the action of the printing apparatus 1 according to the first embodiment. As shown in FIG. 3, firstly, a memory card 17 is installed in the card connector 18 provided on the holding member 16 (step S31). In this case, the memory card 17 is installed so that the entry space provided on the front surface of the memory card 17 faces in the opposite direction from the holding member 16. Thereupon, the holding member 16 is installed in the main body of the print mechanism 10 (step S32).

Next, file attribute data is acquired as the data relating to the recording information recorded on the memory card 17 (step S33). The file attributes include, for example, the file extension, the file recording date and time, the filename, and the like.

Subsequently, in the control unit 22, it is judged whether or not a plurality of files are recorded on the memory card 17, on the basis of the acquired file information (step S34). Here, data relating to the character images, such as text, a symbol, a picture, and the like, corresponding to the file attributes, is stored previously in the memory 23. Thereupon, at step S34, if it is judged that only one file is recorded, then the character image of text, a symbol, a picture, or the like, corresponding to the file attribute of the one file, is acquired from the memory 23 (step S35).

For example, if the recording medium is the memory card 17, as in the present embodiment, and the file extension is taken as the file attribute, then in a case where the file extension corresponds to an image file, a character image which depicts a picture of a camera is acquired. Furthermore, if the file extension corresponds to a written document file, then a character image which depicts text and a pictogram indicating writing is acquired. Furthermore, if the file extension corresponds to a music file, then a character image which depicts a musical note symbol is acquired, for instance. FIG. 4 shows an example of a list of correspondences between file extensions, character images and types of recording medium.

Next, the holding member 16 which is provided with the card connector 18 holding the memory card 17 is conveyed by means of the rollers 13, and the position of the entry space on the memory card 17 is aligned with the position of the head unit 12. The acquired character image is then printed onto the entry space of the memory card 17, by means of the head unit 12 (step S36).

On the other hand, in step S34, if it is judged that a plurality of files are recorded, then the number of files per file attribute is counted (step S37). Thereupon, the file attribute having the largest number of files is determined and a character image, such as text, a symbol, a picture, or the like, corresponding to the file attribute thus determined is acquired from the memory 23 (step S38). The process of acquiring the character image is the same as the step S35 described above, for example.

Next, the holding member 16 which is provided with the card connector 18 holding the memory card 17 is conveyed by means of the rollers 13, and the position of the entry space on the memory card 17 is aligned with the position of the head unit 12. The acquired character image is then printed onto the entry space of the memory card 17, by means of the head unit 12 (step S39).

Figure 5:
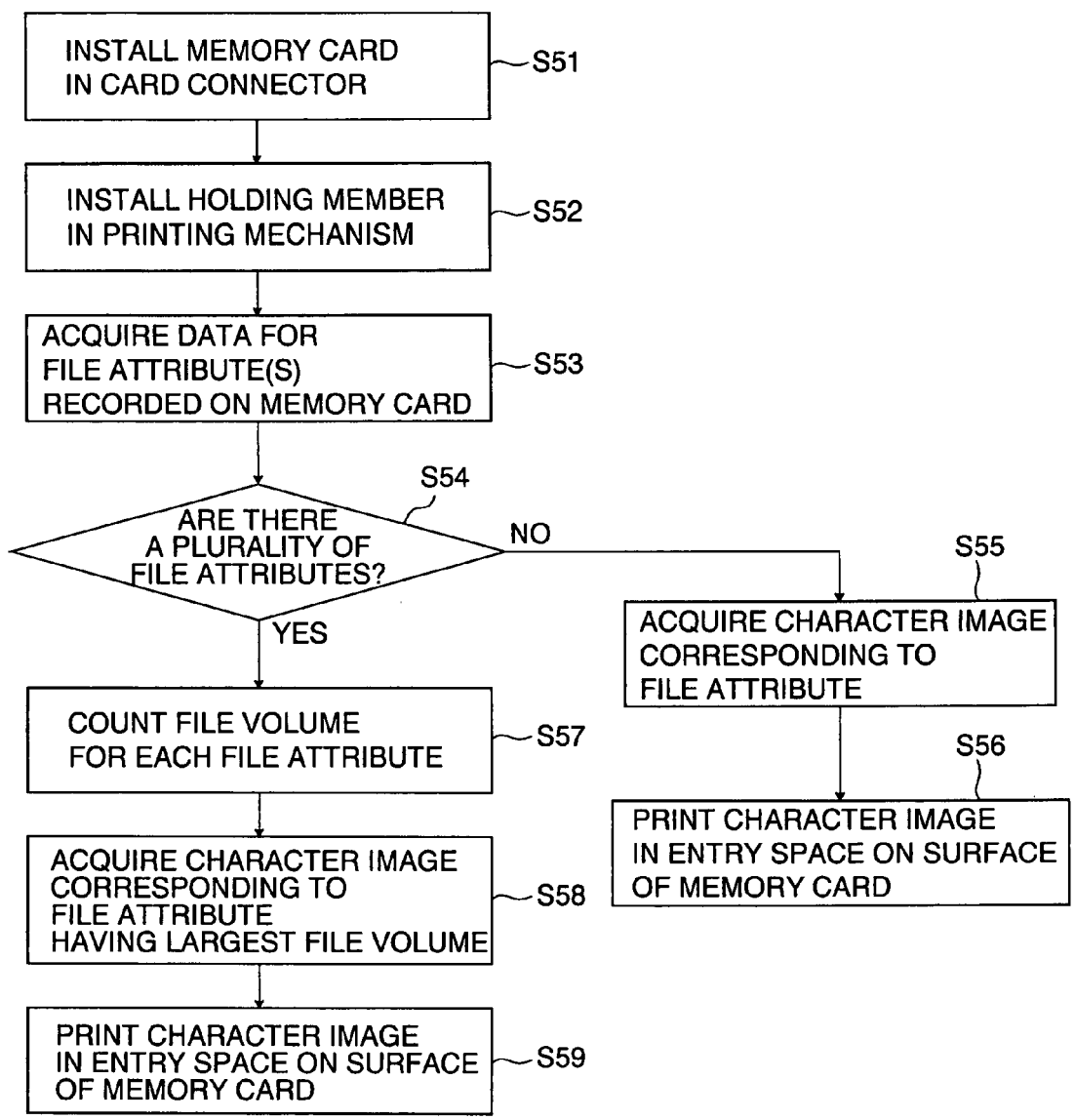
FIG. 5 is a flowchart diagram showing a further example of the action of the printing apparatus according to the first embodiment.

Furthermore, if it is judged that a plurality of files are recorded, then another action, such as the following, for example, can be taken. FIG. 5 is a flowchart diagram showing a further example of the action of the printing apparatus 1 according to the first embodiment. As shown in FIG. 5, if it is judged that a plurality of files are recorded on the memory card 17 at step S54, then the file volume per file is measured (step S57). Thereupon, the file attribute having the largest file volume is determined and a character image, such as text, a symbol, a picture, or the like, corresponding to the file attribute thus determined is acquired from the memory 23 (step S58). The process of acquiring the character image is the same as the case of step S35 in FIG. 3, for example. The acquired character image is then printed onto the entry space of the memory card 17, by means of the head unit 12 (step S59). The other steps are the same as or similar to those in FIG. 3.

Furthermore, although a memory card is mentioned above as one example of the recording medium, the recording medium is not limited to this and the invention is also compatible with a disk medium, such as a compact disk, or the like.

Figure 6:
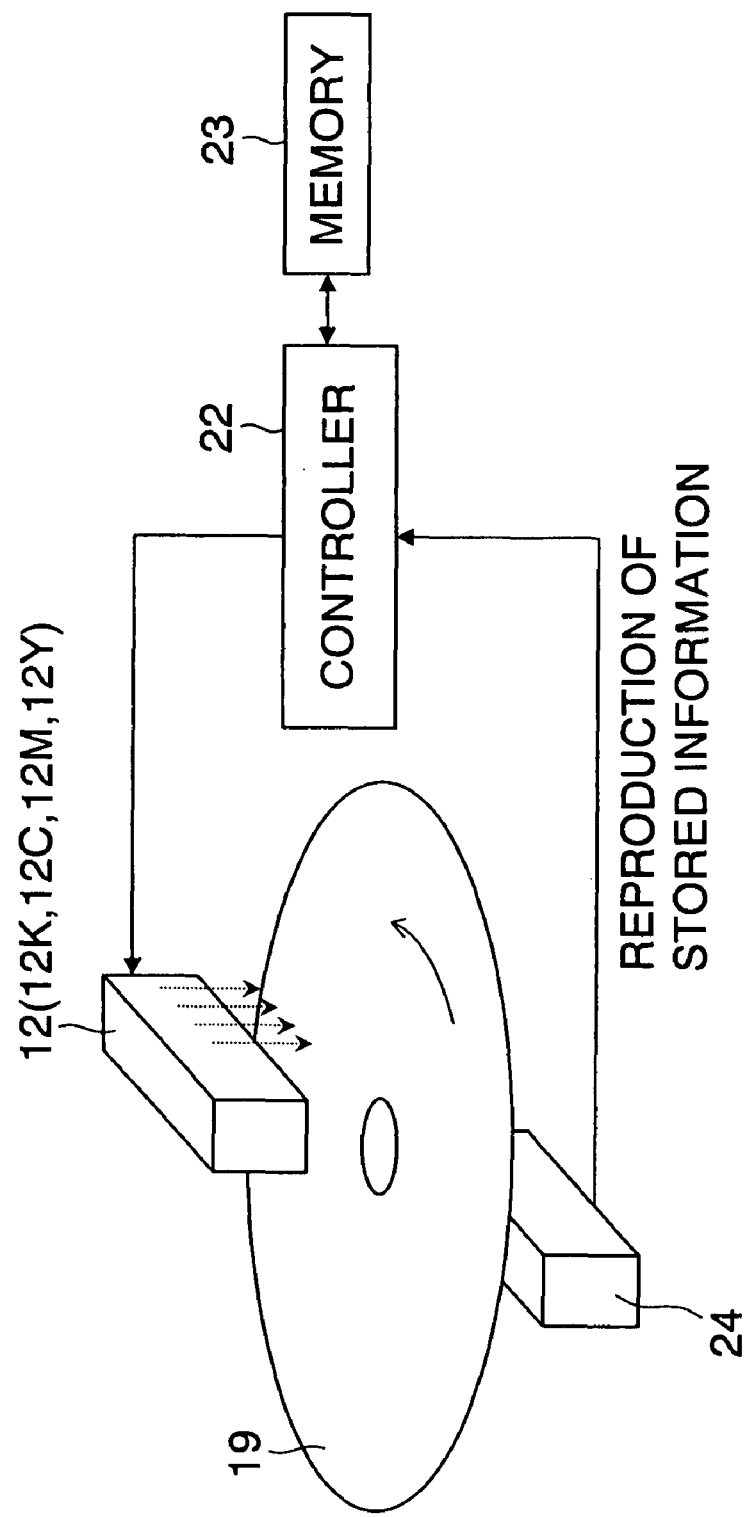
FIG. 6 is a diagram showing an improved example of a printing apparatus according to the first embodiment of the invention.

FIG. 6 shows an example in which improvements are made so as to be compatible with a disk medium, such as a compact disk. In the present embodiment, the recording information in a compact disk 19 is reproduced by an optical pickup section 24, and a character image is printed on the front surface of the compact disk 19 by the head unit 12 on the basis of data relating to the reproduced recording information, by means of the control unit 22 and the memory 23. Since the compact disk 19 has a broader printable surface in comparison with the memory card 17, then a combination of a character image and text string, as shown by the examples of file attributes and the corresponding character images shown in FIG. 4, can be printed on the disk.

The first embodiment is described above.

Figure 7:
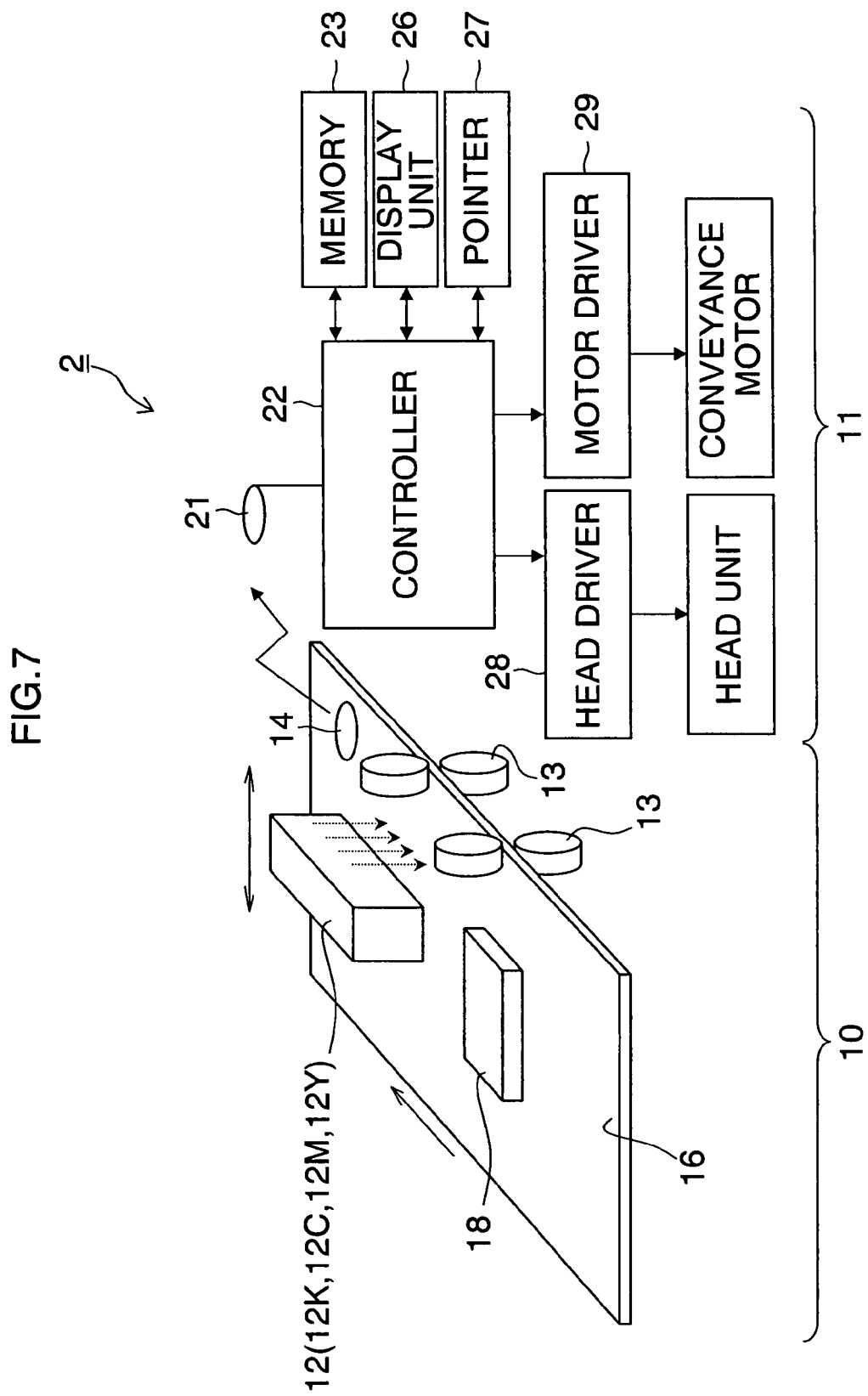
FIG. 7 is a general schematic drawing of a printing apparatus according to a second embodiment of the invention.
Figure 8:
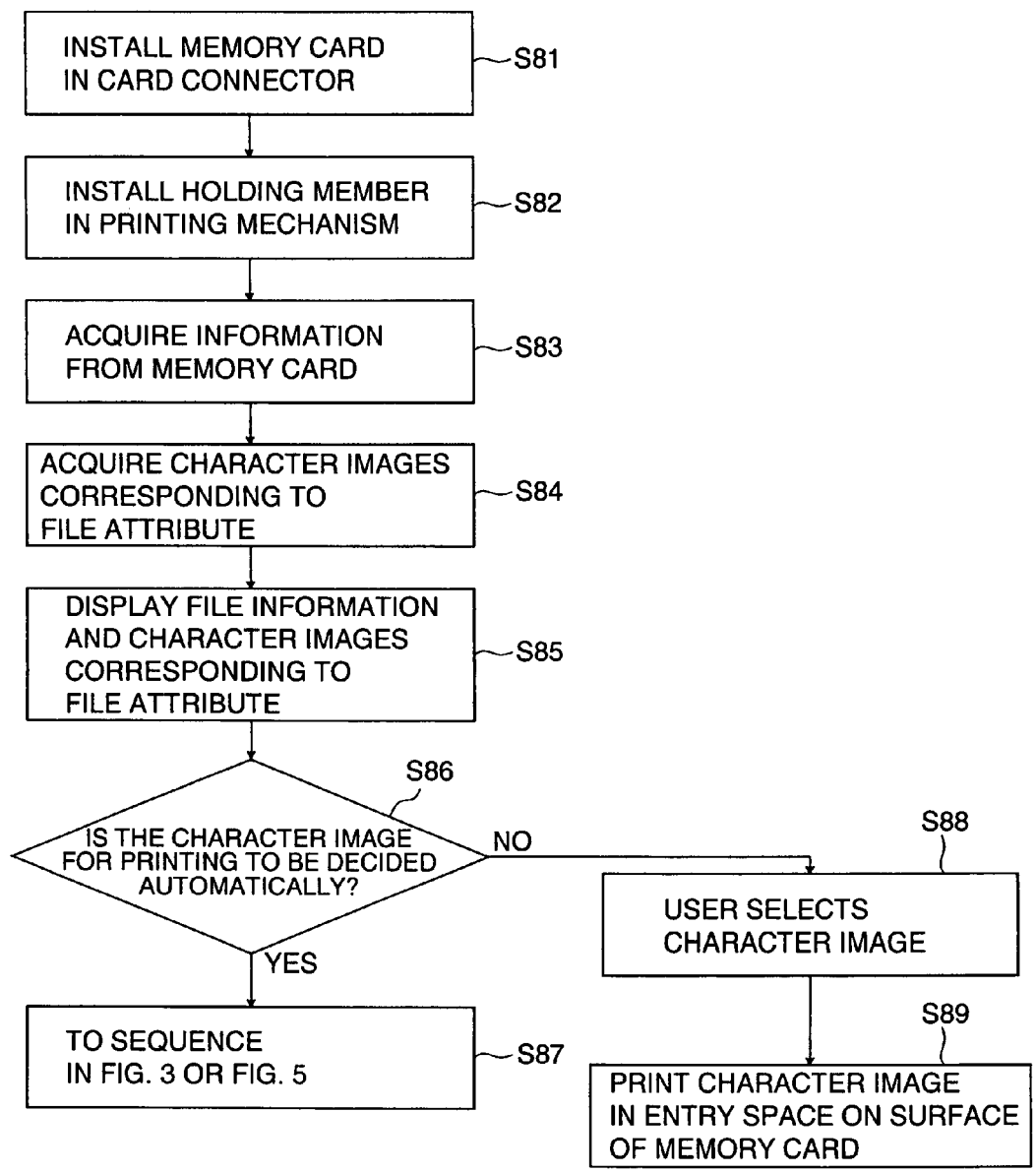
FIG. 8 is a flowchart showing the action of the printing apparatus according to the second embodiment of the invention.

Next, a second embodiment of the present invention is described below. In a printing apparatus according to the second embodiment, in contrast to the first embodiment, the recording information in a memory card is displayed on a monitor, and the user him or herself is able to select a character image to be printed on the entry space of the memory card. FIG. 7 is a general schematic drawing of a printing apparatus 2 according to the second embodiment; and FIG. 8 is a flowchart diagram showing the action of the printing apparatus 2 according to the second embodiment.

As shown in FIG. 7, in the composition of the apparatus, in contrast to the first embodiment, the printing apparatus 2 according to the second embodiment has a display unit 26 and a pointer 27.

Next, the action of the printing apparatus 2 according to this second embodiment is described. As shown in FIG. 8, firstly, a memory card 17 is installed in the card connector 18 provided on the holding member 16 (step S81). In this case, the memory card 17 is installed so that the entry space provided on the front surface of the memory card 17 faces in the opposite direction from the holding member 16. Thereupon, the holding member 16 is installed in the main body of the print mechanism 10 (step S82).

Next, the file information, such as the recording date and time, recorded in the card is acquired from the memory card 17 (step S83). The file attributes include, for example, the file extension, the file recording date and time, the filename, and the like.

Thereupon, a character image, such as text, a symbol, a picture, or the like, corresponding to the file attribute is acquired from the memory 23 (step S84). The method for acquiring the character image is the same as that in the first embodiment.

Thereupon, character images corresponding to the file information and the file attribute are displayed on the display unit 26 (step S85). Next, it is possible to select whether the character image to be printed on the entry space on the memory card 17 is to be decided by the user him or herself or whether it is to be decided automatically (step S86). If it is to be decided automatically, then the character image corresponding to the file attribute having the largest number of files is acquired in accordance with the flowchart according to the first embodiment shown in FIG. 3, or alternatively, the character image corresponding to the file attribute having the largest file volume is acquired in accordance with the flowchart according to the first embodiment shown in FIG. 5, and the character image thus acquired is printed on the entry space on the surface of the memory card 17 (step S87).

On the other hand, if the user selects to decide the character image him or herself, then the user selects the character image that he or she wishes to be printed on the surface of the memory card 17, from the character images shown on the display of the display unit 26, by using a pointer 27 (step S88). The selected character image is then printed onto the entry space of the memory card 17, by means of the head unit 12 (step S89).

Printing apparatuses according to the present invention have been described in detail above, but the present invention is not limited to the aforementioned examples, and it is of course possible for improvements or modifications of various kinds to be implemented, within the range which does not deviate from the essence of the present invention.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A printing apparatus comprising:
   a recording medium holding device which holds a recording medium;
   a recording information acquisition device which acquires data relating to recording information recorded on the recording medium;
   a storage device which stores data relating to character images;
   an automatic determination device which automatically selects the character image corresponding to the data relating to the recording information recorded on the recording medium, from the character images stored in the storage device; and
   a printing device which prints the character image selected by the automatic determination device, onto a surface of the recording medium.

2. The printing apparatus as defined in claim 1, further comprising:
   a display device which displays the recording information and the character images;
   a manual determination device via which the character image corresponding to the data relating to the recording information recorded on the recording medium is selected manually; and
   a determination method selection device which enables choice of whether to select the character image by means of the automatic determination device or whether to select the character image by means of the manual determination device.

3. The printing apparatus as defined in claim 1, wherein, when a plurality of data relating to the recording information are recorded on the recording medium, the automatic determination device counts number of files recorded on the recording medium for each of the plurality of data relating to recording information, and selects the character image for the data relating to the recording information having the greatest number of files recorded on the recording medium as the character image corresponding to the data relating to the recording information recorded on the recording medium.

4. The printing apparatus as defined in claim 1, wherein, when a plurality of data relating to the recording information are recorded on the recording medium, the automatic determination device measures size of a data volume of each of the plurality of data relating to recording information, and selects the character image for the data relating to the recording information having the greatest size of the data volume as the character image corresponding to the data relating to the recording information recorded on the recording medium.

* * * * *